United States Patent
Danzeisen et al.

(10) Patent No.: US 8,045,974 B2
(45) Date of Patent: Oct. 25, 2011

(54) METHOD AND SYSTEM FOR MOBILE IP-NODES IN HETEROGENEOUS NETWORKS

(75) Inventors: Marc Danzeisen, Ittigen (CH); Michael Schaedler, Bolligen (CH); Daniel Rodellar, Lausanne (CH)

(73) Assignee: Swisscom AG, Bern (CH)

( * ) Notice: Subject to any disclaimer, the term of this patent is extended or adjusted under 35 U.S.C. 154(b) by 481 days.

(21) Appl. No.: 11/573,590

(22) PCT Filed: Aug. 17, 2004

(86) PCT No.: PCT/EP2004/051815
§ 371 (c)(1), (2), (4) Date: Feb. 12, 2007

(87) PCT Pub. No.: WO2006/018042
PCT Pub. Date: Feb. 23, 2006

(65) Prior Publication Data
US 2007/0161375 A1 Jul. 12, 2007

(51) Int. Cl.
*H04W 24/00* (2009.01)
*H04W 40/00* (2009.01)

(52) U.S. Cl. ........................................ 455/424; 455/448

(58) Field of Classification Search .................. 455/424, 455/410, 438, 448, 449, 450, 452.2, 435.2
See application file for complete search history.

(56) References Cited

U.S. PATENT DOCUMENTS

| | | | |
|---|---|---|---|
| 6,195,347 B1 * | 2/2001 | Sehgal | 370/354 |
| 6,253,334 B1 * | 6/2001 | Amdahl et al. | 714/4 |
| 7,286,546 B2 * | 10/2007 | Mondal | 370/401 |
| 2002/0016858 A1 * | 2/2002 | Sawada et al. | 709/238 |
| 2002/0194385 A1 | 12/2002 | Linder et al. | |
| 2003/0225887 A1 * | 12/2003 | Purnadi et al. | 709/227 |
| 2004/0034723 A1 * | 2/2004 | Giroti | 710/8 |
| 2004/0105448 A1 * | 6/2004 | Doidge et al. | 370/395.52 |
| 2004/0176023 A1 * | 9/2004 | Linder et al. | 455/3.01 |
| 2005/0102529 A1 * | 5/2005 | Buddhikot et al. | 713/200 |
| 2005/0177733 A1 * | 8/2005 | Stadelmann et al. | 713/185 |
| 2006/0004643 A1 * | 1/2006 | Stadelmann et al. | 705/34 |
| 2006/0034297 A1 * | 2/2006 | O'Neill | 370/395.53 |

FOREIGN PATENT DOCUMENTS
EP 1 271 896 1/2003
EP 1 424 825 6/2004

OTHER PUBLICATIONS

U.S. Appl. No. 11/576,973, filed Apr. 10, 2007, Danzeisen, et al.
U.S. Appl. No. 11/718,567, filed May 3, 2007, Danzeisen, et al.

* cited by examiner

*Primary Examiner* — George Eng
*Assistant Examiner* — Michael Faragalla
(74) *Attorney, Agent, or Firm* — Oblon, Spivak, McClelland, Maier & Neustadt, L.L.P.

(57) ABSTRACT

A method for establishing an optimized communication link between mobile network nodes. An interface management module of a first mobile network node checks the mobile network node for available network interfaces and establishes a look-up table with the available network interfaces. Based on the look-up table at least one signalling channel is set up for configuration data with communication parameters and/or security parameters via one of the available network interfaces with a second mobile network node. Based on the look-up table with the communication parameters and the security parameters at least one data channel is established between the first mobile network node and the second mobile network node. Both the at least one signalling channel and the at least one data channel are able to be set up via one or more network interfaces.

15 Claims, 1 Drawing Sheet

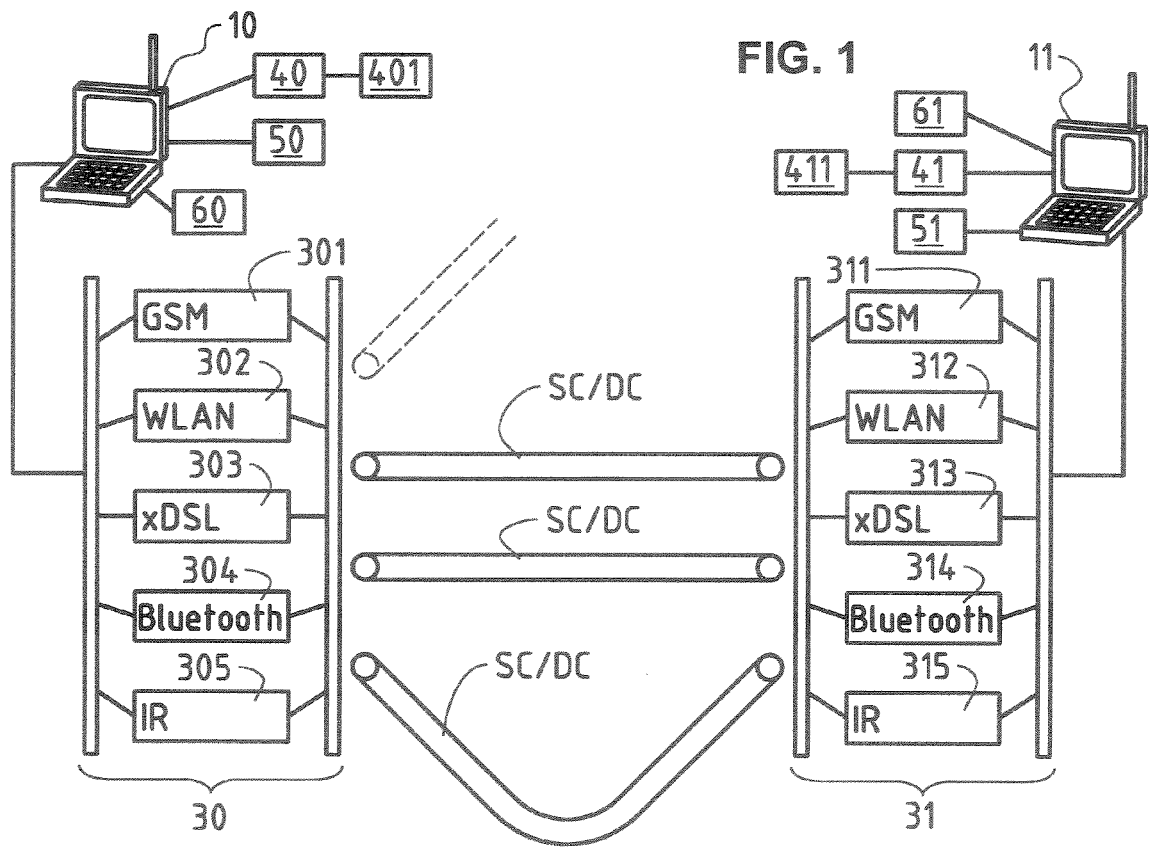
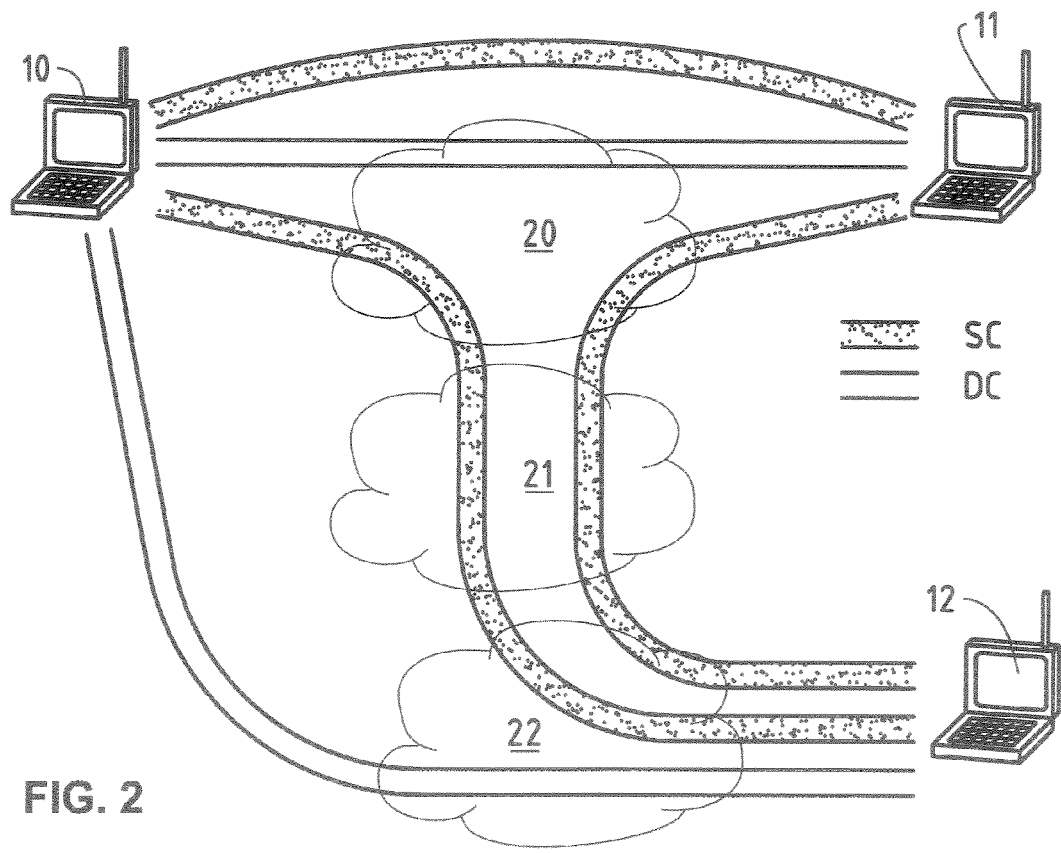

METHOD AND SYSTEM FOR MOBILE IP-NODES IN HETEROGENEOUS NETWORKS

The present invention relates to a method for establishing an optimized communication link and/or a communication network between two and/or more mobile network nodes. In particular, the method relates to mobile nodes in heterogeneous networks.

Worldwide at the present time more and more computer and communication systems are being used to obtain or to transmit large quantities of data, in particular multimedia data, via networks such as e.g. a LAN (Local Area Network), a WAN (Wide Area Network), or the Internet, via e.g. the public switched telephone network (PSTN), a mobile radio network (PLMN: Public Land Mobile Network), such as e.g. GSM (Global System for Mobile Communication) or UMTS networks (Universal Mobile Telephone <sic. Telecommunications>System), or via e.g. a WLAN (Wireless Local Area Network), etc. Data are thereby shown and/or processed and/or made available to other computer systems in a modified way. Such data comprise e.g. digital data such as texts, graphics, pictures, animations, video, Quicktime and sound recordings. Also belonging thereto are MPx (MP3) or MPEGx (MPEG7) standards, as they are defined by the Moving Picture Experts Group. At the same time, in the last few years, the number of mobile network users worldwide, in particular of Internet users and the information offered there, has likewise increased exponentially. The growing offer of IP-capable mobile devices, such as e.g. PDAs, mobile radio telephones and laptops, goes hand-in-hand with this development. The transition from fixed network nodes in networks to flexible requirements through increased mobility has, after all, just begun. In mobile radio telephony, this tendency is also shown itself in new standards such as GPPS (General Packet Radio Services), EDGE (Enhanced Data GSM Environment), UMTS (Universal Mobile Telecommunications Service), or HSDPA (High-Speed Downlink Packet Access), among other things, for example. In order to understand the difference between the momentary reality and the IP connection possibilities of the future, one can call to mind, as a comparison, the development of telephony in the direction of mobility in the last twenty years.

Mobile computer use differs in many ways from computer use and network capability in fixed networks. With mobile network use today there are usually several different network standards for the connection of the mobile network node to a network. The different network connections typically differ greatly, however, in dependence upon the location, network connection, etc., as relates to security, data throughput rate, Quality of Service (QoS) parameters, etc. In particular, a connection can be completely interrupted temporarily. For example. a mobile user can be processed first in the company network by means of fixed net connection, then by means of GPRS or UMTS via a mobile radio network during transit to the airport in a taxi, for instance, and finally continue to work with a WLAN hotspot or access point in the airport waiting room. Existing access to applications on the mobile network node should not be interrupted thereby when the user changes his location in the network. On the contrary, all connection and interface changes should be able to take place automatically and not interactively, e.g. with a change in different networks (Ethernet, mobile radio network, WLAN, Bluetooth, etc.), so that the user does not even need to have knowledge of them. This also applies with an interface change, e.g. during use of real-time applications. Expediently, an interface change should be able to be additionally optimized in the mobile network node based on data transmission bandwidth, costs, security, etc. Ideally, this should be able to happen automatically of course. Based on a stable connection at any time, e.g. to the Internet, real mobile computing exhibits many advantages. It is only with such an access that work may be organized really freely and independently of the desk. The demands on mobile network nodes in networks differ, however, from the mentioned development in mobile radio technology in various ways. The endpoints in mobile radio communication are usually people. With mobile nodes, however, computer applications can carry out interactions between other network participants without any human effort or intervention. Examples of this may be found often enough in airplanes, on ships and in automobiles. Thus mobile computing with Internet access can make sense together with other applications, such as e.g. in combination with position determining devices such as the satellite-based GPS (Global Positioning System).

With mobile network access via Internet protocol (IP), the IP protocol is used to redirect, or respectively route, the data packets from the source address to the destination address in the network by means of so-called IP addresses. These addresses are assigned a fixed location in the network, similar to the telephone numbers of the fixed network of a physical socket. When the destination address of the data packets is a mobile node, this means that with each change of network location a new IP network address has to be assigned, making transparent, mobile access impossible. These problems were resolved by means of the mobile IP standard (IEFT RFC 2002, October 1996 and RFC 3220, January 2002) of the Internet Engineering Task Force (IETF), in that the mobile IP allowed the mobile node to use two IP-addresses, one of them being the normal, static IP address (home address), indicating the location of the home network, whereas the second being a dynamic IP care-of address indicating the current location of the mobile node in the network. The assignment of the two addresses makes it possible to redirect the IP data packets to the correct, momentary address of the mobile node.

The mobile IP of the IEFT does not solve all the problems of mobile network use, however. As mentioned, it can be expedient in the case of a multiplicity of available transmission channels to optimize the transmission channels in the mobile node on the basis of data transmission bandwidth, costs, security, etc., since not all data necessarily require the same QoS parameters Thus the security of the connection can be much more important than e.g. the transmission rate, for instance for the exchange of security parameters and/or configuration parameters, such as e.g. identification and/or authentication by means of passwords, keys for data encryption, etc. On the other hand, with the transmission of large quantities of data, e.g. with multimedia data, etc., the bandwidth can play a bigger role than the data security. This applies especially in the setting up of virtual private communication networks. Virtual, private communication networks make possible direct communication between communication partners (peer-to-peer), without unauthorized third parties entering into the communication, or data from the communication being used improperly. In contrast to real private communication networks, virtual private communication networks are set up via shared communication media, and typically secured against unauthorized third parties by means of cryptographic mechanisms. Shared communication media comprise primarily electromagnetic waves, in particular in the radio range or in the infrared range. To secure the data communication over shared communication media, various cryptographic mechanisms are known to one skilled in the art, for example IPSec (Internet Protocol Security) and SSL (Secure Socket Layer), for establishing secured channels, so-called secure pipes. Major problems arise in ensuring the authenticity of a communication partner because even the use of passwords and/or user identifications does not offer any guarantee that these have been transmitted by the authorized user.

Described in the U.S. Pat. No. 6,445,920 are devices for setting up virtual private communication networks between communication terminals of subscribers in mobile radio networks. According to U.S. Pat. No. 6,445,920, subscribers to the mobile radio network who would like to take part in a joint virtual private communication network, are registered in a user database of the mobile radio network, the so-called HLR (Home Location Register), using a special additional identifier related thereto. According to U.S. Pat. No. 6,445,920, when logging a subscriber into the mobile radio network, a user identification is transmitted from the identification module in the communication terminal of the subscriber to the mobile radio network, as in the standardized GSM mobile radio network (Global System for Mobile Communication), and authenticated between the identification module and an access control unit of the mobile radio network, using a cryptographic method. Subscribers, who are registered in the mobile radio network using the special identifier for a particular virtual private communication network, can call each other in the mobile radio network using registered abbreviated dialing numbers, and can profit from reduced communication fees, according to U.S. Pat. No. 6,445,920.

Although the problem of authentication of the subscriber is solved in the U.S. Pat. No. 6,445,920 through the GSM authentication of the user identifications, U.S. Pat. No. 6,445,920 gives no hint, however, as to how more than two participants can communicate jointly in a virtual private communication network, or how subscribers in a virtual private communication network can communicate with one another outside the mobile radio network. Communication between a multiplicity of communication terminals in virtual private communication networks outside of cellular mobile radio networks is becoming more and more desirable, however, especially with the pervasiveness of communication terminals equipped with communication interfaces for shared communication media. Communication terminals are being equipped more and more often with communication interfaces for local communication networks based on shared communication media, for example WLAN module (Wireless Local Area Network), radio device interfaces such as Bluetooth, or infrared device interfaces such as IrDA (Infrared Data Association).

It is an object of the present invention to propose a new method and new devices, not having the drawbacks of the state of the art, for establishing a data transmission channel, in particular a virtual private communication network between communication terminals. The new method and the new devices should make possible in particular the setting up of a virtual private communication network between a multiplicity of communication terminals, via a shared communication medium, outside cellular mobile radio networks.

These objects are achieved according to the present invention in particular through the elements of the independent claims. Further advantageous embodiments follow moreover from the dependent claims and from the description.

In particular these objects are achieved through the invention in that to establish an optimized communication link and/or a communication network between two and/or more mobile network nodes, an interface administration module of a first mobile network node checks the mobile network node for available network interfaces, and sets up a look-up table with the available network interfaces, in that, based on the look-up table, by means of a signalling router module, at least one signalling channel is set up for transmitting configuration data with communication parameters and/or security parameters via one of the available network interfaces with a second mobile network node, in that, based on the look-up table with the communication parameters and security parameters, at least one data channel is set up between the first mobile network node and the second mobile network node by means of a data router module. In particular, the mobile network nodes can comprise network interfaces to different networks, such as e.g. Ethernet, Bluetooth, mobile radio networks (GSM: Global System for Mobile Communication, UMTS: Universal Mobile Telephone System etc.) or WLAN (Wireless Local Area Network). An advantage of the invention is that the signalling channel for transmitting communication parameters and/or security parameters is able to be configured separately from the data channel for transmission of general data. In particular, different requirements of security, bandwidth, costs, etc., for the different channels can thereby be taken into account or respectively optimized.

In an embodiment variant, an interface administration module of the second mobile network node checks the second mobile network node for available network interfaces, and sets up a second look-up table with available network interfaces of the second mobile network node, configuration data with communication parameters and/or with security parameters based on the first and/or second look-up table being transmitted between the first network node and the second network node, for establishing the at least one signalling and/or data channel. This embodiment variant has the advantage that a data transmission optimized for both sides becomes possible. Thus, for example, optimizations in a user-specific way and/or in a user-controlled way and/or in an automated way can be taken into account for the respective parameters in general or individually. This was not at all possible in this way in the state of the art.

In an embodiment variant, different network interfaces are used for configuration of the at least one signalling channel and/or of the at least one data channel. Such an embodiment variant has the advantage in particular that a signalling or data channel is able to be configured via an especially suitable interface, such as e.g. a network interface with suitable security features and/or a network interface with a suitable data capacity.

In an embodiment variant, a multiplicity of signalling channels and/or a multiplicity of data channels are set up, different network interfaces being assignable to the individual signalling and/or data channels. Such an embodiment variant has in particular the advantage that signalling and/or data channels are able to be configured redundantly via different network interfaces, and thus a greatly heightened data transmission security is achievable in the case of moving mobile network nodes.

In another embodiment variant, the configuration data are transmitted unidirectionally and/or bidirectionally between the first network node and the second network node. The bidirectional transmission has the advantage for certain applications that upon interruption of a data link, the connection can be re-established quickly. For example, the configuration data can also be stored on both sides, it being possible even with a longer interruption to re-establish the connection based on the stored configuration data and not, for instance, via the fallback channel. On the other hand, however, the unidirectional transmission has the advantage, among others, that always just one of the network nodes (e.g. master) has to determine the data link.

In a further embodiment variant, the respective interface administration module periodically checks the first and/or the second mobile network node for available network interfaces, and updates the respective look-up table. This embodiment variant has the advantage that the look-up table is always kept in the current state and is immediately accessible. In particular, through the permanent monitoring of the network interfaces and their features, a change can be automatically made, for example, if network interfaces are available with better transmission options than the currently active ones. As an embodiment variant, it is also possible for the criteria for the automatic change of the interface to be determined by the user. This has the advantage, among others, that the user can configure the interface very individually according to his needs.

In still another embodiment variant, the signalling channel is dynamically adapted and/or changed by means of the signalling router module, based on the first and/or second look-up table and/or on the communication parameters. As embodiment variant, the change can also take place automatically based on criteria specifiable by the user. This has the advantage that depending upon the defined criterion, the mobile node automatically always uses for the signalling channel the interface with e.g. the momentarily greatest available data throughput and/or with the best cost performance ratio and/or security, etc. In particular, the interfaces can also be dynamically configured. This has, among others, the advantage that e.g. services possibly available, such as e.g. a DHCP (Dynamic Host Configuration Protocol) service, can be used, and through automation of the configuration the handling for the user simplified.

In an embodiment variant, further signalling channels are set up based on the first and/or second look-up table and/or on the configuration data, the individual signalling channels being assigned different communication parameters and/or security parameters. For example, with respect to data throughput and/or security, etc., this has the advantage, among others, that parallel signalling channels can be used. In particular, with parallel signalling channels, a fallback channel can always be kept available.

In a further embodiment variant, configuration data are transmitted periodically and/or with change of the look-up table, and, based on the transmitted configuration data, the one or more signalling channels and/or one or more data channels are dynamically routed. Once again, as an embodiment variant, the change can also take place automatically based on criteria specifiable by the user. This has the advantage as mentioned above that, depending upon defined criterion, the mobile node automatically uses the interface with e.g. the momentarily greatest available data throughput and/or with the best cost/performance ratio and/or security, etc., for the signalling channel(s).

In another embodiment variant, the first and/or the second mobile network node comprises a failback signalling channel, the failback signalling channel being used as the temporary signalling channel upon interruption of the one or more signalling channels. This has the advantage, among others, that with short-term and/or longer connection interruption, the connection can be established again immediately via at least one channel, further channels being able to be established, e.g. based on the configuration data.

In another embodiment variant the configuration data comprise parameters for determining the data security and/or reliability and/or the minimal throughput rate and/or the identification and/or the paging and/or the authentication of a signalling channel. This embodiment variant has the same advantages, among others, as the preceding embodiment variant.

In a further embodiment variant, the available network interfaces are configured at least partially dynamically. As above, this has the advantage, among others, that any available services such as e.g. a DHCP (Dynamic Host Configuration Protocol) service, can be used, and the handling for the user simplified through automation of the configuration.

In still another embodiment variant, the available network interfaces are configured at least partially statically. This has the advantage, among others, that the configuration of the network interfaces is always controllable and/or understandable for the user.

With all above-mentioned embodiment variants, it is possible in an additional embodiment variant to buffer outgoing data packets in a data buffer of the mobile node, in case the network connection of the mobile node is interrupted, so that the output data rate of one or more applications may be maintained by means of the data buffer or kept within a certain fluctuation tolerance. The advantage of this embodiment variant is, among others, that with a change in the physical interface, the output data rate, e.g. in an IP application, can be kept constant or respectively within a prescribed fluctuation tolerance as long as the storage capacity of the data buffer is sufficient for storing the outgoing data packets. This has once again the advantage that the data throughput rate is not shut down in the case of an interruption by the applications or the kernel.

It should be stated here that, besides the method according to the invention, the present invention also relates to a system for carrying out this method.

Embodiment variants of the present invention will be described in the following with reference to examples. The examples of the embodiments are illustrated by the following attached figures:

FIG. 1 shows a block diagram illustrating schematically a method and a system for establishing an optimized communication link and/or a communication network between two and/or more mobile network nodes 10,11,12, . . . . In so doing, the at least one signalling channel and the at least one data channel are set up separately and are optimized.

FIG. 2 shows a block diagram illustrating a method and a system for establishing an optimized communication link and/or a communication network between two and/or more mobile network nodes 10,11,12, . . . . The reference symbol SC thereby indicates the signalling channels, while the reference symbol DC denotes the data channels.

FIG. 1 and FIG. 2 illustrate an architecture which can be used for achieving the invention. In FIG. 2, the reference symbol SC refers to the signalling channel and DC to the data channel. The mobile network node(s) 10,11,12, . . . thereby have available the necessary infrastructure including hardware and software components, to achieve a described inventive method and/or system, in particular to establish the connections to the networks 20,21,22, . . . via the available interfaces. Understood by mobile nodes 10 are, among other things, all possible so-called Customer Premise Equipment (CPE) intended for use at different network locations and/or in different networks. The mobile CPEs or network nodes 10 can have one or more different network interfaces 30 which are also able to support different network standards 301,302, 303, . . . or respectively 311,312,313, . . . . The network interfaces 30 of the mobile node 10/11/12 can comprise e.g. interfaces to Ethernet or another wired LAN (Local Area Network), Bluetooth 304/314, GSM (Global System for Mobile Communication) 301/311, GPRS (Generalized Packet Radio Service), USSD (Unstructured Supplementary Services Data, UMTS (Universal Mobile Telecommunications System) and/or WLAN (Wireless Local Area Network), 302 312, xDSL (Digital Subscriber Line) 303/313, IR (Infra-Red) 305/315, etc, The reference numbers 20,21,22, . . . accordingly stand for the various heterogeneous networks, such as e.g. a wired LAN, i.e. a local fixed network, in particular also the PSTN (Public Switched Telephone Network), etc., a Bluetooth network, e.g. for installations in covered localities, a mobile radio network with GSM and/or UMTS, etc., or a wireless LAN. The interfaces 30/31 can be not only packet-switched interfaces, as used directly by network protocols such as e.g. Ethernet or Tokenring, but also circuit-switched interfaces, which are able to be used by means of protocols such as e.g. PPP (Point to Point Protocol), SLIP (Serial Line Internet Protocol) or GPRS (Generalized Packet Radio Ser ice), i.e. which interfaces do not have any network addresses, for example, such as a MAC or a DLC address. The reference number 20 can designate e.g. the accustomed, worldwide IP backbone network. As mentioned, the communication can also take place e.g. over a mobile radio network 21 such as GSM/UMTS, for example also by means of special short messages, e g. SMS (Short Message Services), EMS (Enhanced Message Services), via a signalling channel, such as e.g. USSD (Unstructured Supplementary Services Data) or other techniques, such as MExE (Mobile Execution Environment), GPRS (Generalized Packet Radio Service), WAP (Wireless Application Protocol) or UMTS (Universal Mobile Telecommunications System) or over a service channel.

To set up an optimized communication link SC/DC and/or a communication network SC/DC between two and/or more mobile network nodes 10,11,12, . . . , an interface administration module 40 of a first mobile network node 10 checks the mobile network node 10 for available network interfaces 30, and sets up a look-up table 401 with the available network interfaces 30. As mentioned, the network interfaces 30/31 are administered by an interface administration module 40/41. The network interfaces 30/31 can be physical interfaces, or be generated e.g. by the interface administration module 30/31 through software, i.e. can be virtual interfaces. After a check of the mobile nodes 10/11/21 for available network interfaces, the interface administration module 40/41 connects to one of the available network interfaces 30/31. The checking for the network interfaces 30/31 can take place e.g. periodically, i.e. after expiration of a definable time frame, can be manually configurable, or upon request of the kernel of the mobile network node 10/11/12, for example. The look-up table 401/411 can comprise in particular information, such as possible data throughput rates, network availability, network stability costs of network use, etc. The connection to a particular interface 30/31 can take place based on information stored in the look-up table, with reference to definable criteria. In particular, it can be expedient for the interface administration module 40/41 to change and update the interface 30/31 automatically, based on information from the look-up table. The connection to a particular interface 30/31 can also be determined e.g. by the user and/or take place manually. The available network interfaces 30/31 can be configured dynamically, e.g. by means of a DHCP service (DHCP: Dynamic Host Configuration Protocol), if such means are available, or statically, e.g. by the user, or based on prescribed configuration profiles. Via a current network interface, one or more IP applications of the mobile network node 10/11/12 can access the heterogeneous networks 21,21,22, . . . .

Based on the look-up table 401, a signalling channel SC is established, by means of a signalling router modules 50, for transmitting configuration data with communication parameters and/or security parameters via one of the available network interfaces 30, with a second mobile network node 11. Likewise based on the look-up table 401 with the communication parameters and security parameters, by means of a data router module 60, a data channel DC is set up between the first mobile network node 10 and the second mobile network node 11. As especially follows from FIGS. 1 and 2 in particular, the signalling channel SC and the data channel DC can be established based on different criteria via different network interfaces 30/31 and network standards 301/302/303/304/305, . . . and 311/312/313/314/315, . . . . Of course it is clear that, if the criteria make sense, the signalling channel SC and the data channel DC can take place via the same network connection. If the mobile network node 10/11/12 changes the network inter ace 30/31 or its topological location in the network, the connection to the network interface 30/31 can be updated via the interface administration module 40/41, based on the information of the look-up table. For the data channel DC, a mobile IP module can take over the administration of the IP addresses in the case of a change of the network inter ace 30/31, for example. An IPsec module can update e.g. an IPsec data tunnel configuration according to the current network connection, after which the mobile IP module registers the new care-of address with the home agent, so that the routing of the data packets takes place to the new location or respectively to the new network connection of the mobile network node 10/11/12, and updates the IP configuration, if necessary, with the home agent in accordance with the momentary current network interface or network interfaces. The above-mentioned sequence is according to the invention; the procedure can also take place in reverse order.

With the second mobile network node 11, the interface administration module 41 can likewise check the second mobile network node 11 for available network interfaces 30, and set up a second look-up table 411 with available network interfaces 31 of the second mobile network node 11. To establish the signalling and/or data channel (SC/DC), configuration data can be transmitted, for example, with communication parameters and/or with security parameters based on the first and/or second look-up table 401/411 between the first network node 10 and the second network node 11. Depending upon embodiment variant, the configuration data can be transmitted e.g. unidirectionally or bidirectionally between the first network node 10 and the second network node 11. As above the corresponding interface administration module 40/41, for example, can periodically check the first and/or the second mobile network node 10/11 for available network interfaces 30/31, and update the respective look-up table 401/411. Likewise, by means of the signaling router module 50/51, for example, the signalling channel SC can be dynamically adapted and/or changed, based on the first and/or second look-up table 401/411 and/or on the communication parameters.

It is important to point out that, according to the invention, further signalling channels (SC) can be established based on the first and/or second look-up table 401/411 and/or on the configuration data. The individual signalling channels SC can thereby be assigned different communication parameters and/or security parameters. The configuration data can be transmitted periodically and/or with change of the look-up table 401/411, and, based on the transmitted configuration data, the one or more signaling channels SC and/or one or more data channels DC dynamically routed. Both mobile network nodes 10/11 can comprise a fallback signalling channel, the fallback signalling channel being used as temporary signalling channel SC with interruption of one or more signalling channels SC. The configuration data can further comprise e.g. parameters for determining the data security and/or the reliability and/or the minimal throughput rate and/or the identification and/or the paging and/or the authentication of a signalling channel SC. The available network interfaces 30/31 can be configured unidirectionally or bidirectionally, at least partially dynamically and/or statically.

It remains to be mentioned that, in an extended embodiment example to the above-mentioned embodiment example, outgoing data packets are buffered in a data buffer of the mobile network node 10/11/12, if the network connection of the mobile network node 10/11/12 is interrupted, so that the output data rate of e.g. currently inked IP applications is maintained or kept within a particular fluctuation tolerance by means of the data buffer, i.e. as long as the storage capacity of the data buffer is sufficient for storing the data packets. If the network connection interruption thus lies within the time frame for a connection timeout provided for e.g. in the TCP, the output data rate e.g. for IP applications can be maintained such that no automatic delay in the output rate takes place through the IP applications. The storage of the data packets can take place continuously in the same way, or can take place continuously more and more slowly based on the duration of the interruption. It is to be pointed out that particularly with real-time applications, the data buffer can play an important role in minimizing interruptions and data loss with a change in the topological location of the network. In an embodiment example, the data buffer can be achieved in a way assigned to a network interface 30/31 or in an integrated way, through software or hardware; it can also be achieved separately in the mobile network node 10/11, however.

As an embodiment variant, it is possible for the mobile network node 10/11 to be able to receive the same data packet simultaneously via two or more network interfaces 30/31. This applies both to the signalling channel SC as well as to the data channel DC. Redundant data packets are then automatically recognized in higher layers and correspondingly reduced. Through the simultaneous dispatching of data packets and the parallel receiving of the same data packets by two different network interfaces 30/31, the seamless transition from one interface 30/31 to another can be ensured by the mobile node 10, for example. With the use of mobile IP, for example, at least two care-of addresses can be assigned, corresponding to the momentarily connected current network interfaces 30/31, for example at the signalling channel SC and/or at the data channel DC for a mobile node 10. If more than two network interfaces 30/31 are connected at the same time, the number of assigned care-of addresses increases correspondingly. The home agent routes the IP data packets which have the home address of the mobile node 10 in the IP header, in keeping with the mentioned multiple registration in parallel to the different registered care-of addresses i.e. to different network interfaces of the mobile network node 10/11/12.

The invention claimed is:

1. A method for establishing an optimized communication between a first mobile network node and a second mobile network node, the method comprising:
    first checking, by an interface administration module of the first mobile network node, for different types of network interfaces that are simultaneously available;
    setting up a first look-up table at the first mobile network node by the interface administration module, the look-up table including the available network interfaces obtained from said first checking;
    choosing a signaling channel by a signaling router module of the first mobile network node, from the first mobile network node to the second mobile network node, by selecting one of the available network interfaces resulting from said step of first checking and listed in the first look-up table;
    transmitting first configuration data including data throughput information on the available network interfaces from the first mobile network via the signaling channel to the second mobile node;
    second checking for available network interfaces by an interface administration module of the second mobile network node for different types of network interfaces that are simultaneously available;
    setting up a second look-up table with available network interfaces of the second mobile network node, based on said second checking at the second mobile network node;
    transmitting second configuration data including data throughput information for the available network interfaces based on information of the second look-up table from the second mobile network node to the first mobile network node; and
    setting up a data channel for communicating data between the first mobile network node and the second mobile network node by using a data router module of the first mobile network, based on the first look-up table, the second look-up table, and the first and second configuration data to choose an available network interface with the highest data throughput.

2. The method according to claim 1, further comprising: using different network interfaces for establishing at least one of the signaling channel or the data channel.

3. The method according to claim 1, further comprising: establishing a multiplicity of at least one of signaling channels or data channels, and assigning different network interfaces to the at least one individual signaling channels or individual data channels.

4. The method according to claim 1, further comprising: dynamically adjusting the at least one signaling channel by the signaling router module, based on at least one of the first look-up table or based on the first configuration data.

5. The method according to claim 1, further comprising: establishing a plurality of signaling channels, based on at least one of the first look-up table or the second look-up table.

6. The method according to claim 1, further comprising: using a fallback signaling channel available at at least one of the first or the second mobile network node as a temporary signaling channel upon interruption of the signaling channel.

7. The method according to claim 1, wherein the first and the second configuration data further include parameters for determining at least one of data security, reliability, minimal throughput, identification, paging, or authentication of the signaling channel.

8. The method according to claim 1, wherein the available network interfaces are configured dynamically.

9. The method according to claim 1, wherein the available network interfaces are configured statically.

10. The method according to claim 1, further comprising: buffering outgoing data packets in a data buffer of the first mobile network node, if the network connection of the first mobile network node is interrupted, so that the output data rate of applications linked at a time is maintained by the data buffer or is kept within a particular fluctuation tolerance.

11. A system for automatic optimization of communication links or communication networks between a first and a second mobile network node, the first mobile network node comprising an interface administration module, wherein
the first mobile network node is configured to check by a first checking unit of the interface administration module for different types of network interfaces that are simultaneously available, and is configured to update a first look-up table with the available network interface obtained by the interface administration module, the first look-up table located in a storage unit at the first mobile network node,
the first mobile network node comprises a signaling router module, the signaling router module configured to choose a signaling channel, from the first mobile network node to the second mobile network node, by selecting one of the available network interfaces resulting from the first look-up table updated by the checking made by the first checking unit, and transmitting first configuration data including data throughput information on the available network interfaces to the second mobile node via the chosen one of the available network interfaces,
the second mobile network node is configured to check by a second checking unit of the interface administration module for available network interfaces that are simultaneously available, and is configured to update a second look-up table with the available network interface obtained by the interface administration module, the second look-up table located in a storage unit at the first mobile network node,
the second mobile network node is configured to transmit second configuration data including data throughput information for the available network interfaces based on information of the second look-up table from the second mobile network node to the first mobile network node, and
the data router module of the first mobile network node is configured to establish the data channel based on the first look-up table, the second look-up table, and the first and second configuration data to choose an available network interface with the highest data throughput.

12. The system according to claim 11, wherein different network interfaces are used for establishing at least one signaling channel or data channel.

13. The system according to claim 11, wherein at least one of a plurality of signaling channels or a plurality of data channels are established, different network interfaces being configured to be assigned to the at least one individual signaling channels or to the individual data channels.

14. The system according to claim 11, wherein the at least one signaling channel is configured to be dynamically adjusted by the signaling router module based on the first or second look-up table.

15. The system according to claim 11, wherein a plurality of signaling channels are configured to be established, based on at least one of the first or second look-up table, at least one of different communication parameters or security parameters being assigned to the individual signaling channels.

* * * * *